(12) United States Patent
Watanabe et al.

(10) Patent No.: US 7,011,359 B2
(45) Date of Patent: Mar. 14, 2006

(54) VEHICLE FLOOR PANEL

(75) Inventors: Shigeki Watanabe, Aichi (JP); Hirotaka Shiozaki, Aichi (JP); Koji Nakano, Aichi (JP); Takashi Yamamoto, Aichi (JP); Satoshi Arakawa, Aichi (JP)

(73) Assignee: Mitsubishi Jidosha Kogyo Kabushiki Kaisha, Tokyo (JP)

( * ) Notice: Subject to any disclaimer, the term of this patent is extended or adjusted under 35 U.S.C. 154(b) by 200 days.

(21) Appl. No.: 10/742,873

(22) Filed: Dec. 23, 2003

(65) Prior Publication Data

US 2004/0140690 A1 Jul. 22, 2004

(30) Foreign Application Priority Data

Dec. 27, 2002 (JP) .................. P 2002-379696

(51) Int. Cl.
*B62D 25/20* (2006.01)
(52) U.S. Cl. ............... 296/187.08; 296/193.07
(58) Field of Classification Search ........... 296/187.03, 296/187.08, 193.07
See application file for complete search history.

(56) References Cited

U.S. PATENT DOCUMENTS

| 4,865,378 A | * | 9/1989 | Filtri et al. | 296/193.07 |
| 6,364,401 B1 | * | 4/2002 | Kim | 296/187.03 |
| 6,666,501 B1 | * | 12/2003 | Logan et al. | 296/193.07 |
| 6,793,276 B1 | * | 9/2004 | Sugihara et al. | 296/193.07 |

FOREIGN PATENT DOCUMENTS

JP 2000-255454 A 9/2000

* cited by examiner

*Primary Examiner*—Jason Morrow
(74) *Attorney, Agent, or Firm*—Birch Stewart Kolasch & Birch, LLP

(57) ABSTRACT

A vehicle floor panel has curved portions formed thereon and protruding downward in a spherical fashion, and each of which is surrounded by a substantially horizontal portion. Ribs extending from the curved portions to a vertical wall portion of a tunnel portion and protruding upward are provided. Ribs extending between the curved portions and protruding downward are also provided. Furthermore, ribs protruding upward are provided. According to the construction, the rigidity of various types of vehicle floor panels can be enhanced in an ensured fashion.

19 Claims, 4 Drawing Sheets

VEHICLE FLOOR PANEL

CROSS REFERENCE TO RELATED APPLICATION

This non-provisional application incorporates by reference the subject matter of Application No. 2002-379696 filed in Japan on Dec. 27, 2002, on which a priority claim is based under 35 U.S.C. §119(a).

BACKGROUND OF THE INVENTION

1. Field of the Invention

The present invention relates to a vehicle floor panel structure.

2. Description of the Related Art

An automotive floor structural member such as the one described in JP-A-2000-255454 has been known as an automotive floor structural member which is highly rigid.

The above related art floor structural member has a plurality of curved portions each having a curved surface which protrudes downward. In addition, this floor structural member has upward protruding beads formed in such a manner as to extend from the curved portions to flat planner portions which surround the peripheries of the curved portions. According to the construction of the floor structural member, the rigidity of the floor structural member is enhanced so as to suppress the noise generated in the floor structural member to a lower level.

Since the related art has a simple structure in which the curved portions and the beads are provided on a rectangular or square flat plate, this structure as it is cannot be applied to the practical floor panel configurations. In applying this structure to the practical floor panel configurations, there may occur a case where a higher rigidity is required.

SUMMARY OF THE INVENTION

The present invention aims to enhance the rigidity of a vehicle floor panel structure by disposing optimum curved portions on a vehicle floor panel structure that can be put to practical use.

According to the present invention, there is provided a vehicle floor panel including a curved portion which is surrounded by a substantially horizontal portion and which protrudes downward or upward, a vertical wall portion connected to the substantially horizontal portion, and a rib extending from the curved portion via the substantially horizontal portion to the vertical wall portion.

In addition, according to the present invention, there is provided a vehicle floor panel including a plurality of curved portions each of which is surrounded by a substantially horizontal portion and which protrude downward or upward, and a rib which extends from one of the plurality of curved portions via the substantially horizontal portion to another curved portion and which protrudes in the same direction as a direction in which the curved portion protrudes.

Furthermore, according to the present invention, there is provided a vehicle floor panel including a plurality of curved portions which are provided at a rear portion of a vehicle, each of which is surrounded by a substantially horizontal portion, which are disposed adjacent to each other in a longitudinal direction of the vehicle and which protrude downward or upward, and a rib formed on the substantially horizontal portion between the curved portions in such a manner as to extend in a transverse direction of the vehicle.

Moreover, according to the present invention, there is provided a vehicle floor panel in which a rear portion of the vehicle floor panel is disposed below a front portion of the vehicle floor panel, and in which a plurality of small curved portions are formed on the rear portion of the vehicle floor panel, each small curved portion is surrounded by a substantially horizontal portion, the small curved portions are disposed adjacent to each other in a longitudinal direction of the vehicle and protruding downward.

DETAILED DESCRIPTION OF THE INVENTION

Figure 1:
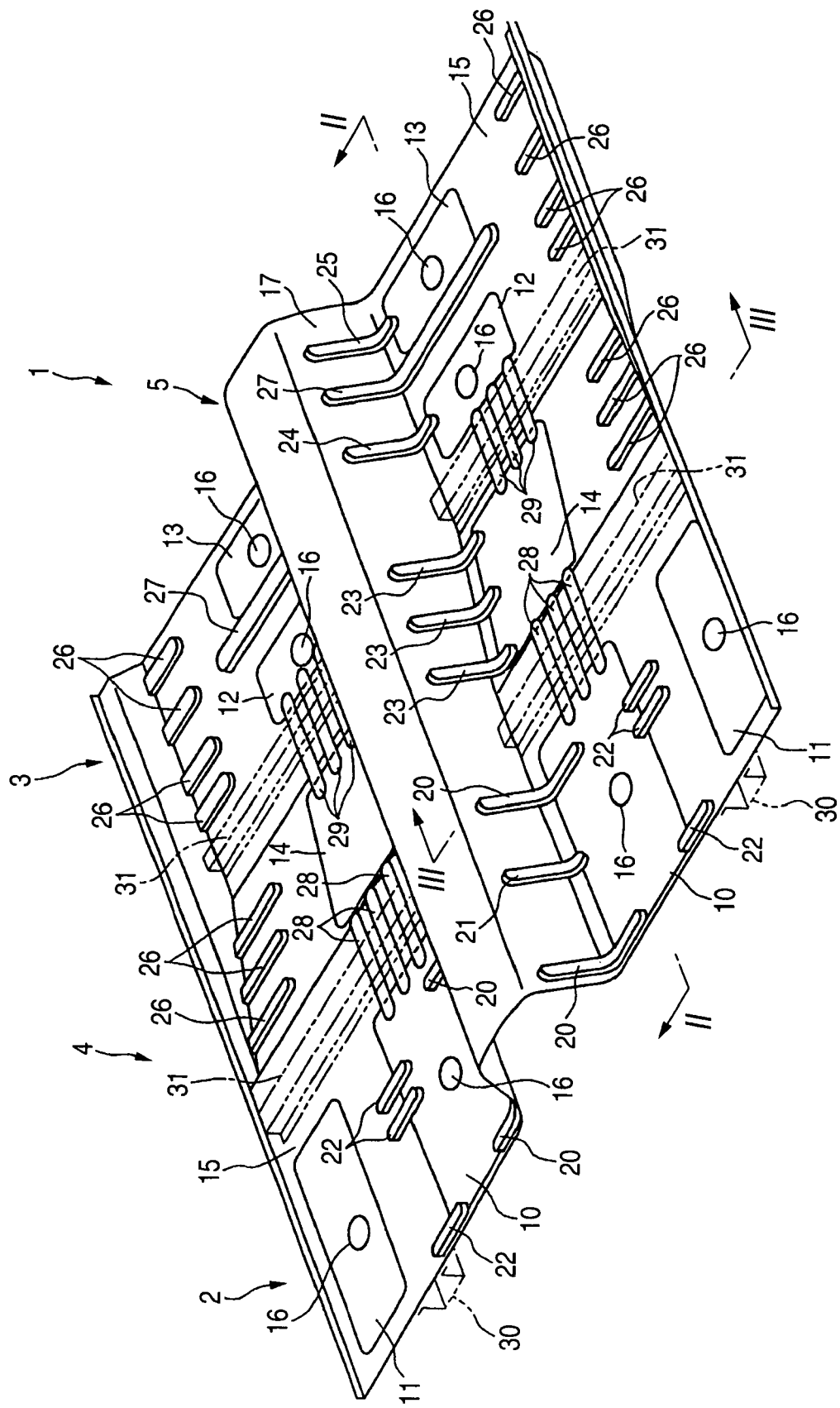
FIG. 1 is a schematic perspective view of an embodiment of the invention.

An embodiment of the invention will be described below with reference to the accompanying drawings.

A vehicle floor panel 1 includes a front portion 2 and a rear portion 3 which are substantially flat, a central portion 4 which is situated between the front portion 2 and the rear portion 3, and a tunnel portion 5 which is formed transversely at a central portion in such a manner as to extend in a longitudinal direction of a vehicle.

The central portion 4 inclines downward from the front portion 2 to the rear portion 3, and the rear portion 3 is disposed below the front portion 2 in level. In addition, the tunnel portion 5 having a top hat-like cross section is formed in such a manner as to extend in the longitudinal direction of the vehicle. Furthermore, the floor panel 1 is formed into a configuration which is substantially symmetrical in a transverse direction of the vehicle relative to the tunnel portion 5.

Curved portions 10, 11 which protrude downward in a spherical fashion are formed on the front portion 2. In addition, curved portions 12, 13 which protruded downward in the spherical fashion are formed on the rear portion 3, and the areas of these curved portions 12, 13 are smaller than those of the curved portions 10, 11. Preferably, the areas of the curved portions 12, 13 may be substantially half of those of the curved portions 10, 11. Furthermore, a curved portion 14 which protrudes downward in the spherical fashion is formed on the central portion 4. The curved portions 10, 11, 12, 13, 14 are each surrounded by a substantially horizontal portion 15, and a through hole 16 is formed in the center of each of the curved portions 10, 11, 12, 13.

In addition, the curved portions 12, 13 are disposed adjacent to each other across the substantially horizontal portion 15 in a longitudinal direction of the vehicle.

The tunnel portion 5 is connected to the substantially horizontal portion 15 in such a manner as to open downward and to rise from the substantially horizontal portion 15.

Additionally, a rib 20 or a bead is provided on the vehicle floor panel 1. This rib 20 is formed so as to extend from the curved portion 10 via the substantially horizontal portion 15 to a vertical wall portion 17 of the tunnel portion 5. Namely, the rib 20 extends inward in a transverse direction of the vehicle. In addition, the rib 20 protrudes upward. The rib 20 is formed, for example, by press molding or sheet metal processing. In this case, the back side of the rib 20 which is opposite to the protruding side is recessed.

Furthermore, a rib 21 is provided on the vehicle floor panel 1. This rib 21 is formed so as to extend from an edge of the curved portion 10 via the substantially horizontal portion 15 to a vertical wall portion 17 of the tunnel portion 5. Namely, the rib 21 extends inward in the transverse direction to a side of the tunnel portion 5. In addition, the rib 21 protrudes upward at the substantially horizontal portion 15 and protrudes outward in the transverse direction at the vertical wall portion 17.

In addition, a rib 22 is provided on the vehicle floor panel 1. This rib 22 extends substantially outward in the transverse direction from the curved portion 10 to the substantially horizontal portion 15. The rib is formed into a relatively small configuration which protrudes upward.

Furthermore, a rib 23 is provided on the vehicle floor panel 1. This rib 23 extends substantially inward in the transverse direction from the curved portion 14 via the substantially horizontal portion 15 to the vertical wall portion 17 of the tunnel portion 5 and protrudes upward.

In addition, a rib 24 is provided on the vehicle floor panel 1. The rib 24 extends substantially inward in the transverse direction from the curved portion 12 via the substantially horizontal portion 15 to the vertical wall portion 17 of the tunnel portion 5 and protrudes upward. Furthermore, a rib 25 extends substantially inward in the transverse direction from the curved portion 13 via the substantially horizontal portion 15 to the vertical wall portion 17 of the tunnel portion 5 and protrudes upward. A rib 26 is formed substantially at an outer side of the substantially horizontal portion 15 and in the transverse direction at each of the rear portion 3 and the central portion 4 in such a manner as to extend substantially in the transverse direction and to protrude upward. A rib 27 extends substantially inward in the transverse direction from the substantially horizontal portion 15 between the curved portions 12, 13 to the vertical wall portion 17 of the tunnel portion 5 and protrudes upward. Namely, the rib 27 is provided to extend in such a manner as to separate the curved portions 12, 13. A rib 28 extends rearward in the longitudinal direction from the curved portion 10 to reach the adjacent curved portion 14 via the substantially horizontal portion 15 and protrudes downward. A rib 29 extends rearward in the longitudinal direction from the curved portion 14 to reach the adjacent curved portion 12 via the substantially horizontal portion 15 and protrudes downward.

Furthermore, a sidemember 30 extends longitudinally on an underside of the vehicle floor panel 1. Specifically speaking, the sidemember 30 has a top hat-like cross section and is coupled to the underside of the vehicle floor panel 1 at flange portions thereof with an opening thereof being made to face upward. A crossmember 31 is disposed to extend transversely on a top surface of the substantially horizontal portion 15 between the curved portions 10, 14 and a top surface of the substantially horizontal portion 15 between the curved portions 12, 14, respectively. Specifically speaking, the crossmembers 31 each have a top hat-like cross section and are coupled to the substantially horizontal portions 15 at flange portions thereof with openings thereof being made to face downward.

Functions and advantages of the invention will be described below based on the construction that has been described heretofore. Namely, since the ribs 20, 21, 23, 24, 25 are formed on the vehicle floor panel 1 which extend substantially inward in the transverse direction from the curved portions 10, 12, 13, 14 via the substantially horizontal portions 15 to the vertical wall portion 17 of the tunnel portion 5, the rigidity of the respective portions at the substantially horizontal portions 15 which are relatively liable to vibrate vertically can be enhanced to thereby suppress effectively the vibrations at the substantially horizontal portions 15. Furthermore, by providing the ribs 22, 26, 27, 28, 29 as a horizontal portions 15, the rigidity of the respective portions at the substantially horizontal portions 15 can be enhanced further to thereby suppress the vibrations.

In addition, the surface rigidity can be enhanced on the whole due to the presence of the curved portions 10, 11, 12, 13, 14 to thereby suppress vibrations at the front portion 2, rear portion 3 and central portion 4.

Furthermore, since the ribs 20, 23, 24, 25 extend from the curved portions 10, 12, 13, 14 where the surface rigidity is large via the substantially horizontal portions 15 to the vertical wall portion 17 of the tunnel portion 5 where the vertical rigidity is large, the rigidity of a corner portion which connects the substantially horizontal portions 15 with the vertical wall portion 17 can be enhanced. In addition, the rigidity of the vertical wall portion 17 along a direction that is substantially a normal direction with respect to the surface of the vertical wall portion 17 can also be enhanced, and folding at the corner portion which connects the vertical wall portion 17 with the substantially horizontal portions 15 can be suppressed effectively. Furthermore, the vibration of the vertical wall portion 17 in a substantially normal direction relative to the surface of the vertical wall portion 17 can be easily suppressed.

In addition, since the through hole 16 is provided, an excess electrodeposition paint at the curved portion 10 or the curved portion 12 can be discharged downward from the through hole 16.

Furthermore, since the three curved portions 10, 12, 14 are formed in alignment in the longitudinal direction of the vehicle with the rib 28 and the rib 29 connecting the curved portions and protruding downward, when applying electrodeposition painting to the vehicle floor panel 1, the electrodeposition paint which remains within the curved portion 14 can be easily introduced into the curved portion 10 or the curved portion 12 through the rib 28 or the rib 29. In particular, this construction is effective in transporting a vehicle floor panel 1 dipped in an electrodeposition paint tank from the tank to an obliquely upward position.

In addition, when the vehicle floor panel 1 is transported from the electrodeposition paint tank in such a manner as described above with the curved portion 10 being positioned obliquely and upward relative to the curved portion 14, since an excess electrodeposition paint remaining in the curved portion 10 flows into the curved portion 14 through the rib 28 and furthermore since an excess electrodeposition paint remaining in the curved portion 14 flows into the curved portion 12 through the rib 29, the necessity of providing in the curved portion 14 a through hole 16 for discharging electrodeposition paint can be obviated. Furthermore, the same can be said in the event that an excess electrodeposition paint remaining in the curved portion 12 flows into the curved portion 14 through the rib 29 and an excess electrodeposition paint remaining in the curved portion 14 flows into the curved portion 10 through the rib 28 when the vehicle floor panel 1 is transported from the electrodeposition paint tank with the curved portion 12 being positioned obliquely and upward relative to the curved portion 14. According to the construction, the number of man-hours for closing the through holes 16 with plugs can be decreased to such an extent that the number of through holes 16 is decreased, thereby making it possible to attempt to reduce costs involved.

In addition, since the rib 28 and the rib 29 are disposed in such a manner as to intersect with the crossmember 31, the surface rigidity of the substantially horizontal portions 15 can be enhanced.

As has been described above, since the surface rigidity of the respective portions of the vehicle floor panel 1 is enhanced remarkably to thereby suppress vibrations at the respective portions effectively, abnormal noise is surely prevented from occurring and the riding comfort within the passenger compartment can be improved.

Figure 2:
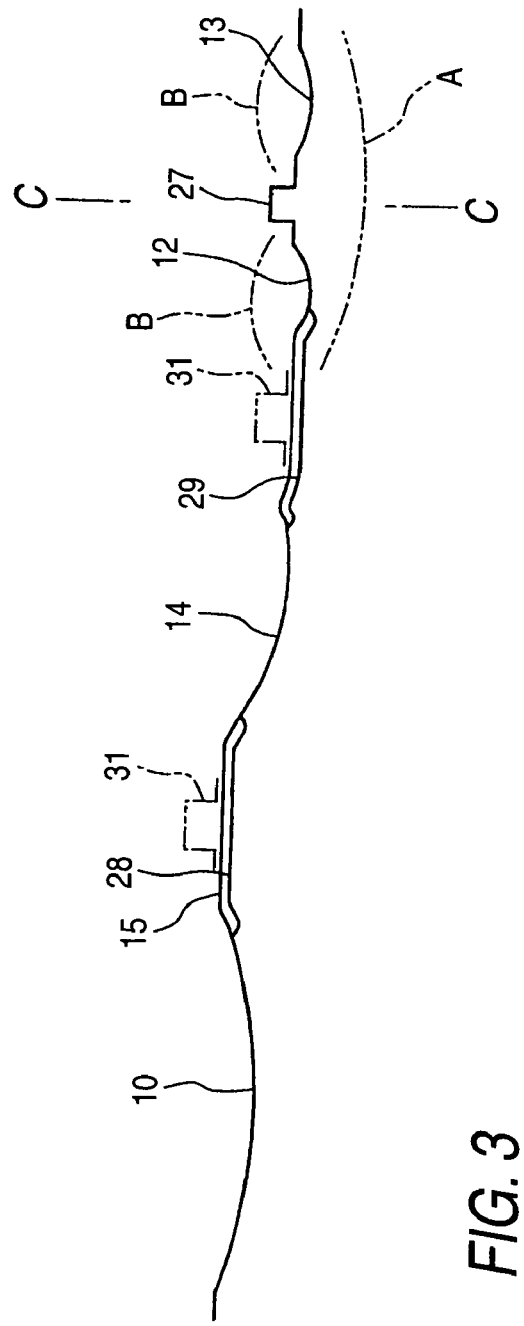
FIG. 2 is a longitudinally cross-sectional view taken along line II—II in FIG. 1.
Figure 3:
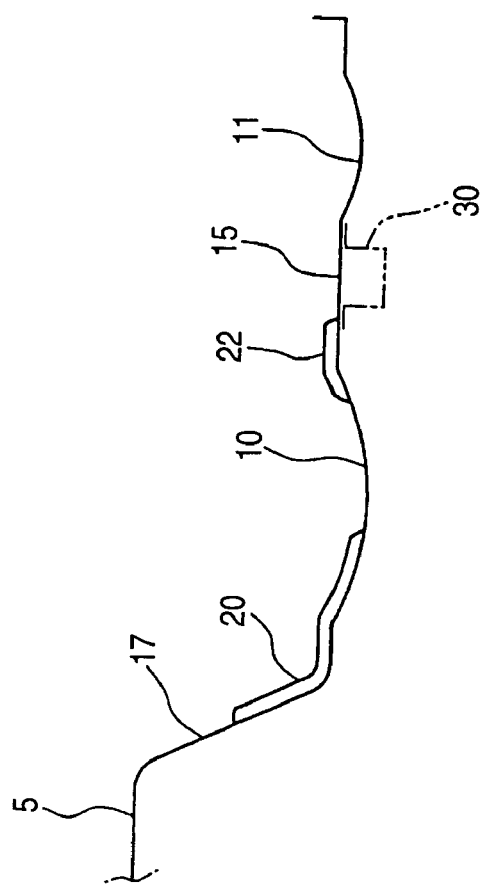
FIG. 3 is a transversely cross-sectional view taken along line III—III in FIG. 1.

In addition, in the rear portion 3 having a relatively large area, the relatively large rib 27 which extends substantially in the transverse direction is formed on the substantially horizontal portion 15 between the small curved portions 12, 13 whose areas are smaller in the longitudinal direction of the vehicle than those of the curved portions 10, 14. The formation of the rib 27 enhances the rigidity of that particular portion of the substantially horizontal portion 15 when compared with that of the remaining portion thereof. To be specific, as shown in FIG. 2, a primary vibration as shown by a line A would be generated in the rear portion 3 which is supported by the crossmember 31 at a longitudinal edge thereof if no rib 27 were formed, but the primary vibration is converted into secondary vibrations shown by lines B due to the presence of the rib 27. As a result of reduction in size of the waveform, a reduction in volume of noise generated by the vibrations in the rear portion 3 can be ensured.

Moreover, since the small curved portions 12, 13 which are arranged in the longitudinal direction are formed in the rear portion 3, the vehicle floor panel 1 can be commonly applied to vehicles each having a floor panel of a different longitudinal length by cutting from the rear portion 3 at rear end side thereof along the line C—C shown in FIG. 2, whereby costs regarding the floor panel can be reduced.

In addition, since most of the rear portion 3 is disposed below the front portion 2 in the vehicle floor panel 1, the space in the passenger compartment above the rear portion 3 can be expanded easily. On the other hand, since the relatively small curved portions 12, 13 are disposed adjacent to each other in the rear portion 3, downward protruding distances of the spherically protruding portions 12, 13 can be made smaller than those of the large curved portions 10, 14, a sufficient minimum ground clearance can be secured for the rear portion 3, even if most of the rear portion 3 is disposed below the front portion 2.

Figure 4:
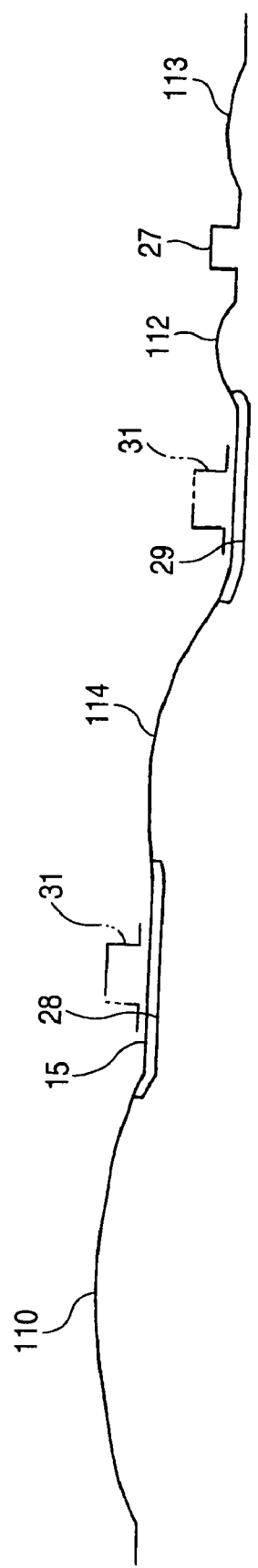
FIG. 4 is one modified example of the embodiment.

In addition, in this embodiment, while the respective curved portions protrude spherically downward, any of the curved portions may be made to protrude upward as required. Such a modified example is shown in FIG. 4. Additionally, the respective curved portions may be made to protrude downward or upward in any other configurations than the spherical one such as an arc-like configuration (for example, a semi-cylindrical configuration).

Figure 5:
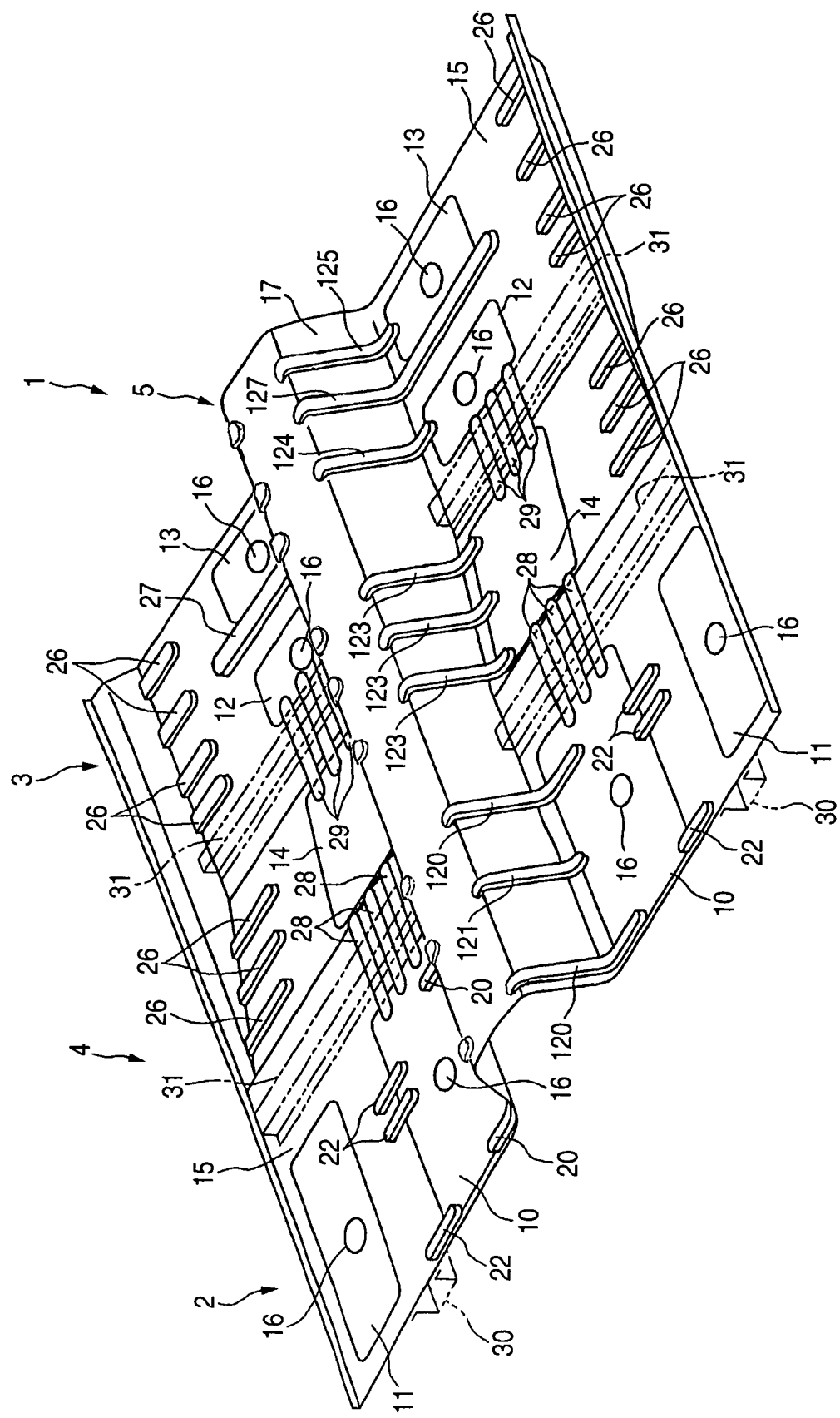
FIG. 5 is another modified example of the embodiment.

Furthermore, instead of being made to extend as far as the vertical wall portion of the tunnel portion, the ribs may be made to extend as far as an upward vertical wall portion formed on a rear side of the floor panel. While in this embodiment the ribs are provided so as to extend to an intermediate portion of the vertical wall portion of the tunnel, the ribs may be made to extend to a top portion of the vertical wall portion as shown in FIG. 5.

Needless to say, the invention should not be limited to the embodiments described above but may be modified variously without departing from the spirit and scope thereof.

What is claimed is:

1. A vehicle floor panel, comprising:
   a substantially horizontal portion;
   at least one curved portion surrounded by the substantially horizontal portion and protruding in one of a downward direction and an upward direction;
   a vertical wall portion connected to the substantially horizontal portion; and
   at least one rib extending from the curved portion via the substantially horizontal portion to the vertical wall portion, at least a portion of the rib overlapping the curved portion.

2. The vehicle floor panel as set forth in claim 1, wherein the vertical wall portion rises from the substantially horizontal portion and extends in a longitudinal direction of a vehicle.

3. The vehicle floor panel as set forth in claim 2, wherein the vertical wall portion constitutes a side of a tunnel portion having a top hat shaped cross section that opens downward.

4. The vehicle floor panel as set forth in claim 3, wherein the rib extends to a top surface of the tunnel portion.

5. The vehicle floor panel as set forth in claim 1, wherein the rib is formed into a configuration in which the rib protrudes upward from the substantially horizontal portion and protrudes outward in a transverse direction of a vehicle from the vertical wall portion.

6. A vehicle floor panel, comprising:
   a substantially horizontal portion;
   a plurality of curved portions each of which being surrounded by the substantially horizontal portion and which protrude one of an downward direction and an upward direction of a vehicle; and
   a rib extending from one of the plurality of curved portions via the substantially horizontal portion to another adjacent curved portion, at least a portion of the rib overlapping the plurality of curved portions.

7. A vehicle floor panel, comprising:
   a substantially horizontal portion;
   a plurality of curved portions each of which being surrounded by the substantially horizontal portion and which protrude one of an downward direction and an upward direction of a vehicle; and
   a rib extending from one of the plurality of curved portions via the substantially horizontal portion to another adjacent curved portion,
   wherein, the plurality of curved portions includes at least three curved portions disposed in alignment in a longitudinal direction of a vehicle,
   the rib connects is connected to the plurality of curved portions, and
   a through hole is formed in each of the curved portions disposed at ends of the alignment of the three curved portions.

8. The vehicle floor panel as set forth in claim 7, wherein the rib protrudes downward from the substantially horizontal portion.

9. The vehicle floor panel as set forth in claim 8, wherein
   a crossmember is disposed on a top surface of the substantially horizontal portion in such a manner as to extend in a transverse direction of the vehicle; and
   the rib intersects with the crossmember.

10. A vehicle floor panel, comprising:
    a substantially horizontal portion;
    two curved portions provided adjacent to each other in a longitudinal direction of a vehicle at a rear portion of the vehicle, each of the two curved portions being surrounded by the substantially horizontal portion and protruding in one of a downward direction and an upward direction of the vehicle; and a rib formed on the substantially horizontal portion between the two curved portions in such a manner as to extend in a transverse direction of the vehicle.

11. The vehicle floor panel as set forth in claim 10, further comprising:

a vertical wall portion which rises from the substantially horizontal portion and which extends in the longitudinal direction of the vehicle, wherein the rib extends from the substantially horizontal portion to the vertical wall portion.

12. The vehicle floor panel as set forth in claim 11, wherein the vertical wall portion constitutes a side of a tunnel portion formed so as to have a top hat shaped cross section that opens downward.

13. A vehicle floor panel, comprising:

a substantially horizontal portion;

a first curved portion provided in a first portion of the vehicle floor panel and being surrounded by the substantially horizontal portion and protruding in one of an upward direction and a downward direction; and a second curved portion provided in a second portion of the vehicle floor panel behind the first portion with respect to a longitudinal direction of a vehicle and surrounded by the substantially horizontal portion, the second curved portion protruding in one of an upward direction and a downward direction; and at least one rib extending in the longitudinal direction between the first curved portion and the second curved portion.

14. The vehicle floor panel as set forth in claim 13, wherein the first portion of the vehicle floor panel is a front portion of the vehicle floor, and the second portion of the vehicle floor is a central portion of the vehicle floor.

15. The vehicle floor panel as set forth in claim 13, wherein the first portion of the vehicle floor panel is a central portion of the vehicle floor, and the second portion of the vehicle floor is a rear portion of the vehicle floor.

16. A vehicle floor panel, comprising:

a substantially horizontal portion;

a first curved portion provided in a front portion of the vehicle floor panel and being surrounded by the substantially horizontal portion and protruding in one of an upward direction and a downward direction;

a second curved portion provided in a central portion of the vehicle floor panel behind the front portion with respect to a longitudinal direction of a vehicle and surrounded by the substantially horizontal portion, the second curved portion protruding in one of an upward direction and a downward direction; and a third curved portion provided in a rear portion of the vehicle floor panel having at a height lower than the front portion and behind the central portion with respect to the longitudinal direction of a vehicle, the third curved portion being surrounded by the substantially horizontal portion and protruding in one of an upward direction and a downward direction.

17. The vehicle floor panel as set forth in claim 16, wherein the third curved portion is smaller than the first curved portion.

18. The vehicle floor panel as set forth in claim 16, further comprising:

a rib that extends in the longitudinal direction between the first curved portion and the second curved portion.

19. The vehicle floor panel as set forth in claim 16, further comprising:

a rib that extends in the longitudinal direction between the second curved portion and the third curved portion.

* * * * *